No. 627,731. Patented June 27, 1899.
A. HANSEN & T. LINDGREEN.
COVER FOR PNEUMATIC TIRES.
(Application filed Aug. 3, 1897.)

(No Model.)

Witnesses:
B. W. Sommers
D. S. Ober

Inventors:
Albrecht Hansen
Theodor Lindgreen,
by ____ atty.

THE NORRIS PETERS CO., PHOTO-LITHO., WASHINGTON, D. C.

UNITED STATES PATENT OFFICE.

ALBRECHT HANSEN AND THEODOR LINDGREEN, OF COPENHAGEN, DENMARK.

COVER FOR PNEUMATIC TIRES.

SPECIFICATION forming part of Letters Patent No. 627,731, dated June 27, 1899.

Application filed August 3, 1897. Serial No. 646,902. (No model.)

*To all whom it may concern:*

Be it known that we, ALBRECHT HANSEN and THEODOR LINDGREEN, manufacturers, of Copenhagen, Denmark, have invented certain new and useful Improvements in Covers for Pneumatic Tires for Cycles and the Like; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to remove the inconvenience caused by pneumatic tires for cycles and other vehicles being punctured by hitting against sharp stones, fragments of glass, or the like. This object is attained by inclosing in the cover fine closely-woven calcined metal gauze.

Figure 1:
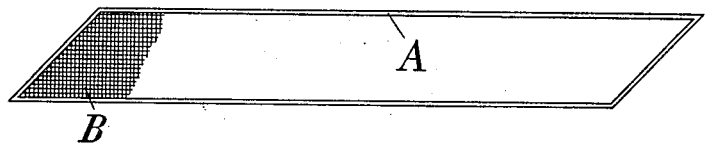
Figure 2:
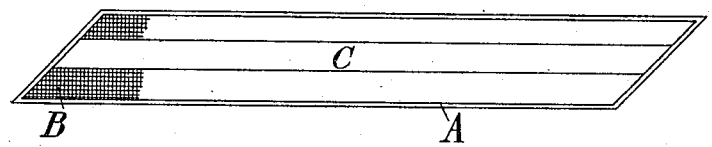
Figure 3:
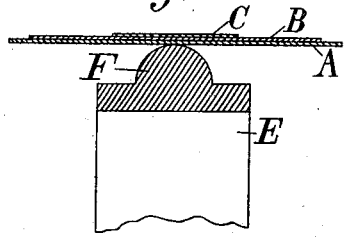
Figure 4:
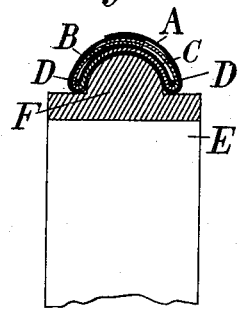

The drawings show different phases of the manufacture, which takes place in the following manner: A strip of linen A of the shape shown in Figure 1, coated with cement, and a similar, but somewhat smaller, strip B of the above-described metal gauze are placed one upon the other and glued together. Along the middle of the strip of metal gauze B, on the still free side, a narrower strip of linen C, cut diagonally and also previously coated with cement, is glued on, Fig. 2. The obliquely-cut ends of these three layers are then fastened together, so that a ring is formed, which is put upon a mold E, having a cross-section as shown in Figs. 3 and 4, in which figures is also seen a cross-section of the ring formed by the three layers. The sides of the ring are now bent down over the semicircular mold F, (shown in cross-section,) coppered-wire edgings D, Fig. 4, are pushed in over them, and the edges of the strips A and B folded upward and glued together exactly on the middle of the mold F, Fig. 4. The width of the strip C is such that it reaches exactly around the circumference of the mold F from wire edging to wire edging, whereas the widths of the strips A and B are such that the edges after being bent up over the edgings overlap each other on the middle of the mold E. Lastly, an india-rubber covering is glued on, as usual, and after being sufficiently dried the cover is removed from the mold.

By placing the metal gauze as described above it is on both sides covered by linen, so that it cannot by friction injure the pneumatic tire. Through being calcined it has become so elastic that the ring runs extremely smoothly, at the same time being capable of an almost absolute resistance against being punctured, this resistance being increased by the linen strips being coated with cement. The possibility of an explosion of the tube is also excluded.

For heavier vehicles several layers of metal gauze and cement-coated linen strips may be used in the above manner.

We claim—

A protective covering for pneumatic tires composed of the strip of textile material A, the strip of a closely-woven metallic fabric B narrower than the strip A, and of the strip or band of textile material C, said strips cemented together throughout their contacting surfaces and folded so that the edges of the strip A will overlap along the line of the tread of the tire, the strip C being of such width as to form with the strip A a sheathing for the intermediate wire fabric and prevent the latter from coming in contact with itself or with the tire and outer covering, wires D inserted in the bights along opposite edges of the cover for securing the same to the wheel-rim, and an outer cover of rubber cemented to the protective covering, substantially as and for the purpose set forth.

In testimony that we claim the foregoing as our invention we have signed our names in presence of two subscribing witnesses.

ALBRECHT HANSEN.
THEODOR LINDGREEN.

Witnesses:
T. HANSEN,
JULES BLOM.